United States Patent
Tran

(10) Patent No.: US 12,272,167 B2
(45) Date of Patent: Apr. 8, 2025

(54) SYSTEMS AND METHODS FOR AUTOMATED ACCEPTANCE OF FORM DOCUMENTS

(71) Applicant: STATE FARM MUTUAL AUTOMOBILE INSURANCE COMPANY, Bloomington, IL (US)

(72) Inventor: Thy Timothy Tran, Vancleave, MS (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 363 days.

(21) Appl. No.: 17/966,336

(22) Filed: Oct. 14, 2022

(65) Prior Publication Data

US 2024/0119752 A1    Apr. 11, 2024

Related U.S. Application Data

(60) Provisional application No. 63/413,490, filed on Oct. 5, 2022.

(51) Int. Cl.
  *G06V 30/413*    (2022.01)
  *G06V 10/82*    (2022.01)
  *G06V 30/19*    (2022.01)
  *G06V 30/412*    (2022.01)

(52) U.S. Cl.
  CPC ............ *G06V 30/413* (2022.01); *G06V 10/82* (2022.01); *G06V 30/19147* (2022.01); *G06V 30/412* (2022.01)

(58) Field of Classification Search
  CPC .......... G06V 30/413; G06V 30/19147; G06V 30/412; G06V 10/82
  USPC .......................................................... 382/157
  See application file for complete search history.

(56) References Cited

U.S. PATENT DOCUMENTS

| 6,643,035 | B1 * | 11/2003 | Salgado | ............. | H04N 1/00053 |
| | | | | | 358/488 |
| 2005/0216493 | A1 * | 9/2005 | Fujita | ..................... | G06F 40/226 |
| 2019/0213408 | A1 * | 7/2019 | Cali | ..................... | G06V 30/414 |
| 2020/0125928 | A1 * | 4/2020 | Doyle | .............. | G06V 30/19147 |
| 2022/0222284 | A1 * | 7/2022 | Sahoo | ................... | G06F 16/316 |

* cited by examiner

*Primary Examiner* — Allen H Nguyen
(74) *Attorney, Agent, or Firm* — MARSHALL, GERSTEIN & BORUN LLP

(57) ABSTRACT

The following generally relates to using image classification techniques to determine the acceptability of form documents. In some examples, an image classification model may be trained to apply a first label to form documents that are acceptable and a second label to form documents that are unacceptable. In these examples, the image classification model may include a neural network, such as a convolutional neural network. Accordingly, the systems and methods generally relate to obtaining a submitted form document, inputting the submitted form document into the trained image classification model, and/or enforcing the acceptability decision of the image classification model.

20 Claims, 4 Drawing Sheets

SYSTEMS AND METHODS FOR AUTOMATED ACCEPTANCE OF FORM DOCUMENTS

CROSS-REFERENCE TO RELATED APPLICATIONS

This application claims priority to and the benefit of the filing date of provisional U.S. Patent Application No. 63/413,490 entitled "Systems and Methods for Automated Acceptance of Form Documents," filed on Oct. 5, 2022, the entire contents of which are hereby expressly incorporated herein by reference.

FIELD

The present disclosure generally relates to automating acceptance of form documents, and more particularly relates to using image classification models to determine the acceptability of form documents.

BACKGROUND

Form documents often have requirements set out by governing bodies that determine acceptability thereof. For example, some form documents require wet-ink signatures. Such form documents may not be accepted by the governing body if the submitter inserted their signature using a word processing application. However, it is often difficult to manually detect whether a signature applied to the document is applied via wet-ink or via a word processing application using a script font. As such, conventional form document review processes often incorrectly determine the acceptability of form documents. Conventional techniques may have additional drawbacks as well.

SUMMARY

In general, the present embodiments relate to, inter alia, applying machine learning technology to reduce the above-mentioned errors in determining form document acceptability, thereby improving underlying processes associated with the form document.

In one aspect, a computer-implemented method for determining acceptability of a form document may be provided. The method may be implemented via one or more local or remote processors, transceivers, sensors, servers, memory units, wearables, smart glasses, augmented reality glasses, virtual reality headsets, mobile devices, smart watches, and/or other electronic or electrical components. The method may include (1) obtaining, via one or more processors, a form document under test of a form type; (2) inputting, via the one or more processors, the form document under test into an image classification model trained by (i) applying a first label to a first set of images representative of form documents of the form type that are acceptable, (ii) applying a second label to a second set of images representative of form documents of the form type that that exhibit at least one characteristic that renders the form document unacceptable, and/or (iii) training a neural network using the labeled first and second sets of images such that the neural network applies the first label to input form documents that are acceptable and the second label to input form documents that exhibit at least one characteristic that renders the form document unacceptable; (3) detecting, via the one or more processors, that the image classification model applied the first label to the form document under test; and/or (4) accepting, via the one or more processors, the form document under test. The method may include additional, fewer, or alternate actions, including those discussed elsewhere herein.

In another aspect, a system for determining acceptability of a form document is provided. The system may include one or more local or remote processors, transceivers, sensors, servers, memory units, wearables, smart glasses, augmented reality glasses, virtual reality headsets, mobile devices, smart watches, and/or other electronic or electrical components. In one aspect, the system may include (i) one or more processors; and/or (ii) one or more non-transitory memories storing processor-executable instructions. The instructions, when executed by the one or more processors, may cause the system to (1) obtain a form document under test of a form type; (2) input the form document under test into an image classification model trained by (a) applying a first label to a first set of images representative of form documents of the form type that are acceptable, (b) applying a second label to a second set of images representative of form documents of the form type that that exhibit at least one characteristic that renders the form document unacceptable, and/or (c) training a neural network using the labeled first and second sets of images such that the neural network applies the first label to input form documents that are acceptable and the second label to input form documents that exhibit at least one characteristic that renders the form document unacceptable; (3) detect that the image classification model applied the first label to the form document under test; and/or (4) accept the form document under test. The system may perform additional, less, or alternate functionality, including that discussed elsewhere herein.

In yet another aspect, a non-transitory computer readable storage medium storing computer-executable instructions may be provided. The instructions, when executed by one or more processors, may cause the one or more processors to (1) obtain a form document under test of a form type; (2) input the form document under test into an image classification model trained by (i) applying a first label to a first set of images representative of form documents of the form type that are acceptable, (ii) applying a second label to a second set of images representative of form documents of the form type that that exhibit at least one characteristic that renders the form document unacceptable, and/or (iii) training a neural network using the labeled first and second sets of images such that the neural network applies the first label to input form documents that are acceptable and the second label to input form documents that exhibit at least one characteristic that renders the form document unacceptable; (3) detect that the image classification model applied the first label to the form document under test; and/or (4) accept the form document under test The instructions may cause the processors to perform additional, less, or alternate functionality, including that discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1:
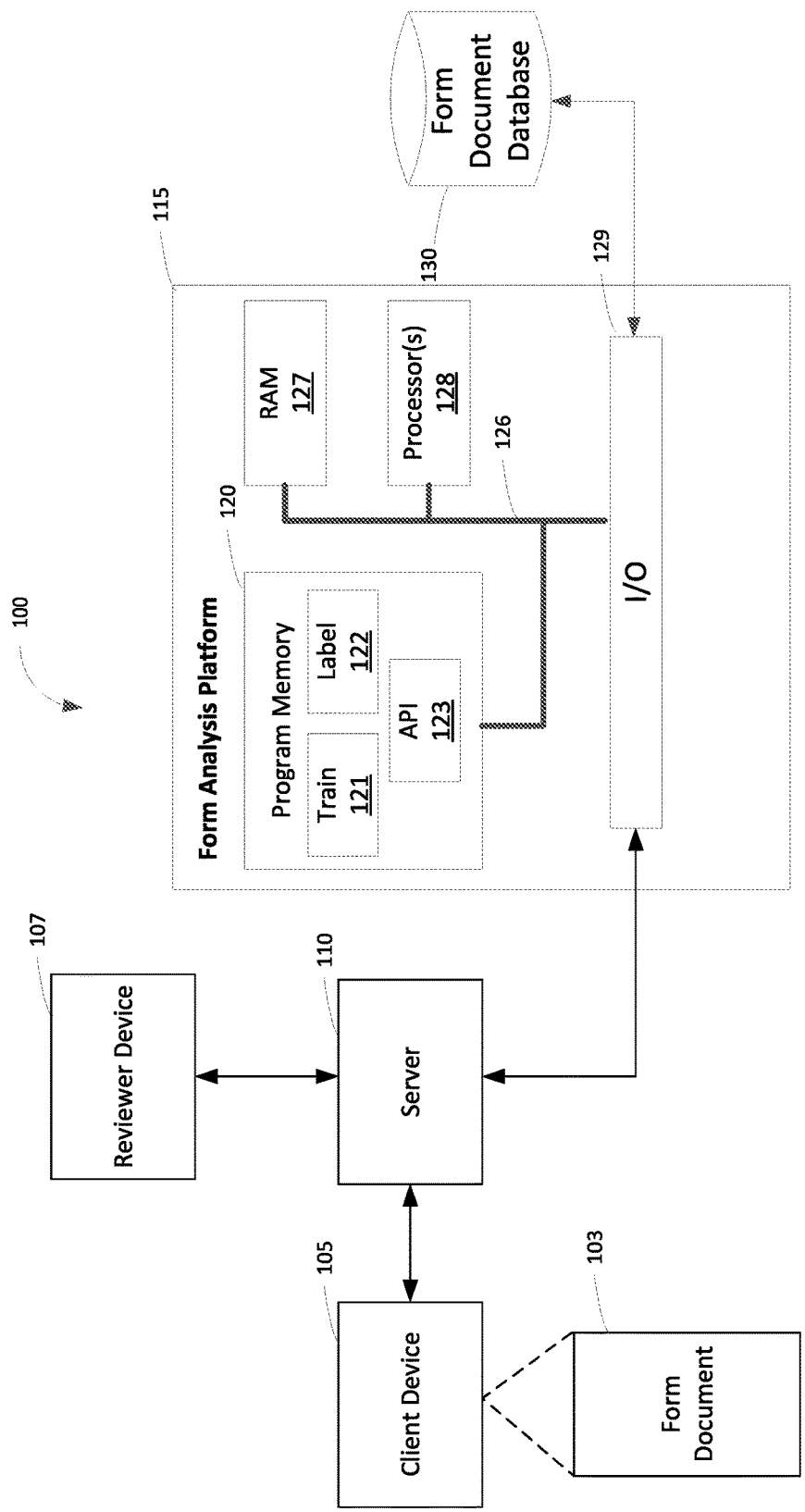
FIG. 1 shows an exemplary form analysis computing platform.

The systems and methods disclosed herein generally relate to, inter alia, training and machine learning techniques (such as image classification) to determine the acceptability of form documents. As it is generally used herein, the term "form document" refers to a standardized document that is submitted for acceptance by a submitter. For example, the standardized document may be an insurance application form, a title transfer form, a governmental and/or regulatory form document, and/or other types of standardized documents. Additionally, as it is generally used herein, the term "form document" may also refer to a set of image data representative of the form document (e.g., a scanned copy of the form document, an image of the form document, an electronically generated and/or submitted form document, and so on).

According to certain aspects, there are various reasons why a form document may be deemed unacceptable. As one example, some form document types may require a wet-ink and/or handwritten signature to be acceptable. It should be appreciated that the term "handwritten signature" includes electronic signatures that were written by hand using, for example, a stylus and/or via a touch-screen of an electronic device. In this example, if the form includes a non-handwritten signature (e.g., a signature applied by typing out the signature, a signature generated using a standardized cursive font, etc.), the form document may be rejected as lacking the required signature. As another example, some form document types may include a mix of fields that are required and fields that are optional. Accordingly, if a required field is not filled out in a submitted form document, the form document may be rejected as lacking a required field. While the instant disclosure generally refers to non-handwritten signatures and/or missing required fields as example characteristics that render a form document unacceptable, it should be appreciated these are examples are provided for ease of explanation and that additional acceptability requirements are envisioned as well.

Techniques disclosed herein may relate to integrating a trained image classification model into the form submission pipeline to determine form document acceptability. In some embodiments, the image classification model may include a neural network, such as a convolutional neural network (CNN) model. For example, the CNN may be trained on a set of labeled historical data to produce a binary classification decision as to whether or not an input form document is acceptable. Accordingly, the training data may include a first set of images of form documents that are labeled as being acceptable and a second set of images of form documents that are labeled as being unacceptable. It should be appreciated that in some embodiments that rely upon historical form documents, personally identifiable information may be anonymized and/or scrubbed before the corresponding image is included in the second set of images.

Generally, the second set of images should include a sufficient number of images of historical form documents for characteristic that causes a form document to be unacceptable. For example, if the form requires a handwritten signature, the second set of images may be configured to include a threshold number of images of historical form documents that include non-handwritten signatures. As another example, if the form requires particular fields to be filled in, the second set of images may be configured to include a threshold number of images of historical form documents that failed to fill in the required fields. In this example, each required field may be associated with a respective threshold number of images.

According to certain aspects, the threshold number of documents may be chosen to avoid biasing the trained image classification model. In some embodiments, this means that there are roughly the same number of images that represent each characteristic that renders the form document unacceptable. If a particular image is associated with a form document that exhibits multiple characteristics that render the form unacceptable, the image may count towards both threshold.

By training an image classification model in the disclosed manner, the trained model may be able to detect any characteristic that renders a form document of a particular form document type unacceptable. As such, the need to train component image classification models to detect individual defects may be avoided. This may result in a faster evaluation of a form document under test and/or reduce the amount of time needed to automate the evaluation of form documents of a new form type.

Exemplary Form Analysis Environment

FIG. 1 illustrates a block diagram of an exemplary form analysis environment 100 in which the techniques disclosed herein may be implemented. The form analysis environment 100 includes a form analysis platform 115. In some embodiments, the form analysis platform 115 is operated by a processor of form documents, such as an insurance company, a governmental and/or regulatory agency, a bank and/or other type of financial institution, and so on. Accordingly, the form analysis platform 115 may be provided to determine the acceptability of form documents submitted by clients of the processor of form documents.

As illustrated, the form analysis platform 115 may include one or more processors 128 configured to execute instructions that form the various applications, modules, and other components of the form analysis platform 115 described herein. In cloud computing embodiments, the processors 128 may be physically located in different hardware entities (e.g., servers) while still being logically connected to execute the various tasks described herein. The processors 128 may include central processing units (CPUs), graphics processing units (GPUs), application-specific integrated circuits (ASICS), and/or any other types of computer processors. While the disclosure may generally refer to the processors 128 executing the various tasks described herein, particular tasks may be better suited to one type of processor. For example, the repetitive analysis associated with some operations described herein (e.g., the training routines) may be more efficiently executed by GPUs than CPUs. Accordingly, in embodiments that include multiple types of processors, the form analysis platform 115 may utilize a particular type of processor to execute instructions that are more efficiently executed by the particular type of processor.

The form analysis platform 115 may also include a program memory 120, a random-access memory (RAM) 127, and an input/output (I/O) circuit 129, all of which may be interconnected via an address/data bus 126. It should be appreciated the memory of the form analysis platform 115 may include multiple RAMs 127 and multiple program memories 120 implemented as any type of memory, such as semiconductor memory, magnetically readable memory, or optically readable memory, for example. Similarly, although the I/O circuit 129 is shown as a single block, it should be appreciated that the I/O circuit 129 may include a number of different types of I/O circuits. For example, the I/O block 129 may include one or more transceiver circuits to facilitate communications with other computing components and/or directly with data sources.

The program memory 120 may store any number of applications, routines, tools, or other collections of computer-readable instructions that support the analytics techniques described herein. For example, the program memory 120 may include a training application 121 configured to train an image classifier for determining the acceptability of an input form document, a labeling application 122 configured to input a form document into the trained image classifier to obtain an acceptability determination, and/or an application programming interface (API) application 123 via which other computing devices, such as a server 110, may invoke the training application 121 and/or the labeling application 122. Of course, other applications that leverage the disclosed form analysis techniques may be stored at the program memory 120.

As illustrated, the form analysis platform 115 may be connected to a form document database 130 that at which a plurality of historical form documents are maintained. For example, the form document database 130 may store a plurality of historical form documents of a particular type that have been processed by the processor of form documents. In some embodiments, the historical form documents may be form documents that have been reviewed for acceptability using conventional, manual techniques. In these embodiments, the historical form document may also be associated with an indication (e.g., a label) of the historical acceptability decision that is used as the truth when training the image classifier model.

Additionally, the form analysis platform 115 may be communicatively coupled to a server 110 at which a form processing pipeline is implemented. For example, the form analytics platform 115 and the server 110 may be communicatively coupled via one or more wired or wireless networks that facilitate any type of data communication via any current or future-developed standard or technology (e.g., GSM, CDMA, TDMA, WCDMA, LTE, NR, 6G, EDGE, OFDM, GPRS, EV-DO, UWB, IEEE 802 including Ethernet and Wi-Fi, WiMAX, Bluetooth, and others). It should be appreciated that while FIG. 1 depicts the server 110 and the form analysis platform 115 as separate entities, in alternate embodiments, the functionality of the server 110 and the form analysis platform 115 are implemented at the same computing entity (e.g., either one of the server 110 and the form analysis platform 115).

As part of implementing the form processing pipeline, the server 110 may be configured to invoke the functionality of the form analytics platform 115. For example, the server 110 may generate one or more instructions in accordance with a public API supported by the API application 123 and transmit the generated instruction to the form analytics platform 115 for processing thereat.

In one example, the server 110 may generate and transmit an instruction for the form analysis platform 115 to train an image classifier for determining the acceptability of form documents of an indicated form type. In this example, the API application 123 may detect the instruction form the server 110 and invoke the training application 121 to train the indicate image classifier. In response, the training application 121 may identify a plurality of historical form documents of the indicated form document type and their corresponding labels maintained at the form document database 130. The training application 121 may then analyze the identified form documents to generate a training sample set of form documents. As described herein, the training sample set may include a first set of form documents that were deemed to be acceptable and a second set of form documents that were deemed to be unacceptable.

Using the training the set of documents, the training application 121 may then train an image classifier to output a classification decision on whether or not an input form document is acceptable. For example, the image classifier may be a binary classification model, such as a CNN, a logistic regression model, a naive Bayes model, a support vector machine (SVM) model, and so on. The training application 121 may store the trained model data at the form analytics platform 115.

In another example, the server 110 may generate and transmit an instruction for the form analysis platform 115 to generate a label indicative of acceptability of an input form document. To this end, the server 110 may be commutatively coupled with a client device 105, such as a mobile phone, a laptop computer, a tablet, a smart wearable device (e.g., smart glasses, a smart watch), a home personal assistance device, or any other electronic device that is normally used to access internet-based content. For example, the client device 105 may be communicatively coupled to the server 110 via one or more wired or wireless networks that facilitate any type of data communication via any current or future-developed standard or technology (e.g., GSM, CDMA, TDMA, WCDMA, LTE, NR, 6G, EDGE, OFDM, GPRS, EV-DO, UWB, IEEE 802 including Ethernet and Wi-Fi, WiMAX, Bluetooth, and others).

Accordingly, the user of the client device 105 may interact with the client device to submit a filled out form document 103 to the server 110. For example, the server 110 may support a web interface and/or a client application that executes on the client device and via which a user can upload the form document 103. Upon receiving the form document 103, the server 110 may generate an instruction formatted in accordance with the public API supported by the API application 123. More particularly, the server 110 may generate and transmit an instruction configured to cause the form analysis platform 115 to input the form document 103 into the trained image classification model and return an indication of the output acceptability determination label.

Upon receiving the instruction, API application 123 may invoke the labeling application 122. For example, the instruction may indicate a location at which a copy of the form document 103 may be obtained and a form document type associated with the form document. In response, the API application 123 may obtain the copy of the form document 103 and cause the labeling application 122 to input the copy of the form document 103 into the trained image classifier for the indicated form document type. The API application 123 may detect the output label applied by the labeling application 122 (e.g., "acceptable" or "unacceptable") and return an indication of the applied label to the server 110. In some embodiments, the form analysis platform 115 may also store the copy of the form document 103 and the applied label at the form document database 130.

According to aspects, the server 110 may then process the form document 103 in accordance with the returned indication from the form analysis platform 115. For example, if the form analysis platform 115 returns an indication that the form document 103 is unacceptable, the server 110 may generate an alert to the client device 105 that the form document 103 could not be accepted for processing. In some embodiments, the alert is provided via the web interface and/or the client application executing on the client device 105. If the form analysis platform 115 returned an indication that the form 103 is acceptable, the server 110 may then proceed with processing the form document 103. In this scenario, the server 110 may also alert the client device 105 that the form document 103 was accepted and is being processed.

According to certain aspects, performance of the trained image classifier may be evaluated to detect a need to re-train the image classifier. Accordingly, the server 110 may also be communicatively coupled to a reviewer device 107. To this end, the reviewer device 107 may be a mobile phone, a laptop computer, a tablet, a smart wearable device (e.g., smart glasses, a smart watch), a home personal assistance device, or any other electronic device. In some embodiments, the reviewer device 107 may be the same device as the client device 105.

Figure 2:
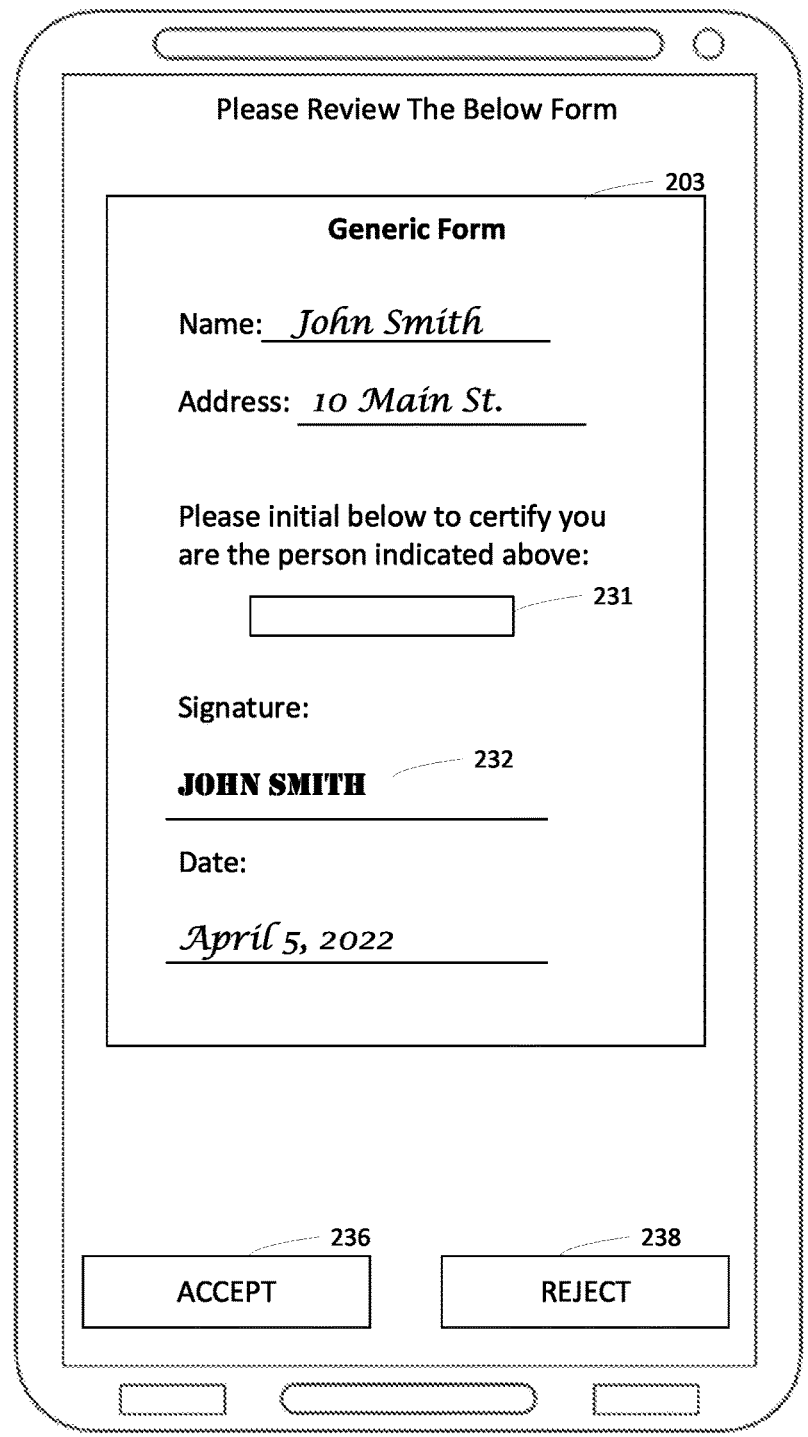
FIG. 2 illustrates an exemplary display for reviewing classification decisions provided by the image classification model.

The reviewer device 107 may be configured to execute a form review application via which a reviewer may provide review decisions regarding the acceptability of a form document. With simultaneous reference to FIG. 2, illustrated is an exemplary user interface 200 for reviewing the acceptability of a form document. As part of the review process, the server 110 may obtain form documents, such as a form document 203, from the form document database 130 that were evaluated by the trained image classifier of the labeling application 122. The server 110 may then configure the user interface 200 to display the form document 203 for review by the reviewer.

Accordingly, the reviewer may then manually review the acceptability of the form document 203. For example, the reviewer may detect that a required field 231 of the form document 203 is blank. As another example, the reviewer may detect that a signature 232 applied to the form document 203 is a non-handwritten signature. Accordingly, the reviewer may determine that the form document 203 is unacceptable. As illustrated, the user interface 200 includes element 238 via which the review may indicate that the form document 203 is unacceptable. In response to detecting reviewer selection of the element 238, the server 110 may be configured to present a new form document for review.

As illustrated, the user interface also includes element 236 via which the reviewer may indicate that the presented form document is acceptable. For example, if the new form document presented by the server 110 includes data entered into the required field and includes a handwritten signature, the reviewer may determine that the new form document is acceptable. It should be appreciated that the user interface 200 is one example reviewer interface and that other reviewer interfaces may include additional, fewer, or alternate user interface elements.

The server 110 may continue presenting form documents to the reviewer device 107 until a sufficient number of review decisions is reached. The server 110 may then compare the review decisions from the reviewer device 107 to the acceptability labels applied by the image classifier of the labeling application 122. If the review decisions do not align with the acceptability labels, the server 110 may re-train the image classifier using the review decisions as the re-training data set. That is, the server 110 may generate an instruction in accordance with the API application 123 such that the form analysis platform 115 executes the training application 121 to re-train the image classification model of the labeling application 122 using the review decisions provided by the reviewer device 107.

Exemplary Training of Image Classification Model

Figure 3:
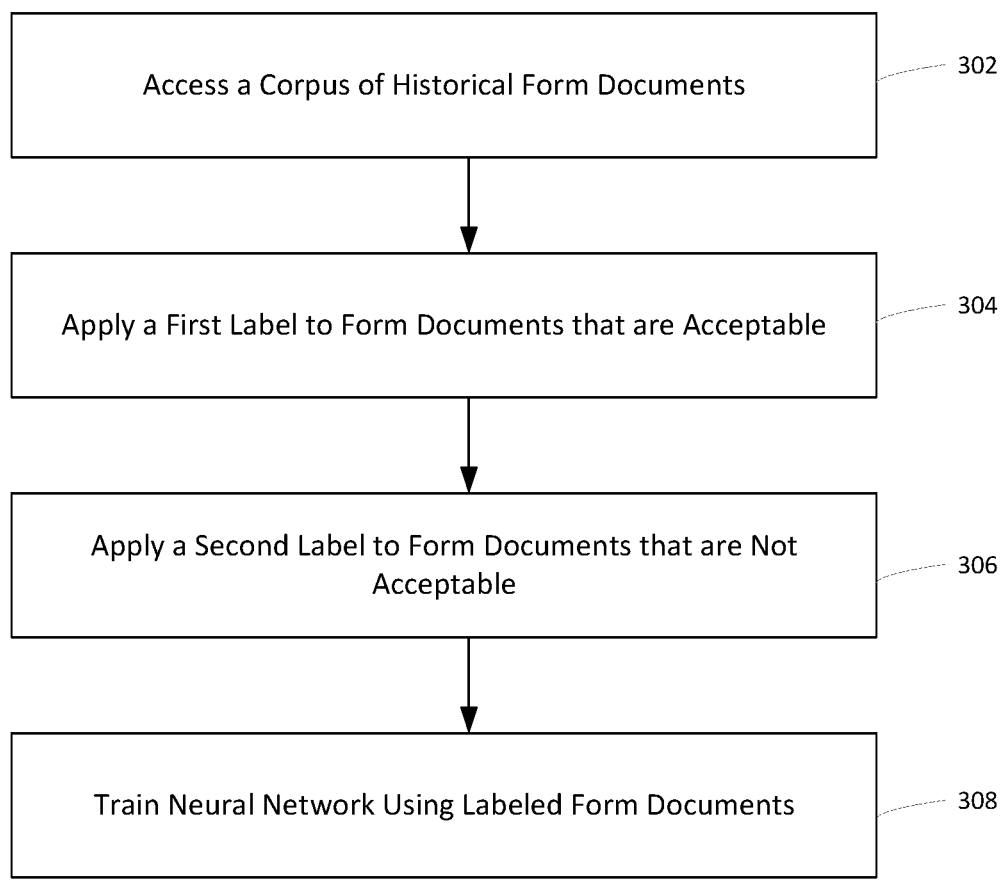
FIG. 3 illustrates a block diagram of an exemplary computer-implemented method for training an image classification model, in accordance with embodiments disclosed herein.

FIG. 3 illustrates a block diagram of an exemplary computer-implemented method 300 for training an image classification model. The method 300 may be performed by a form analysis platform (such as the form analysis platform 115 of FIG. 1) executing a training application (such as the training application 121 of FIG. 1).

The method 300 may begin at block 302 when the form analysis platform accesses a corpus of historical form documents. For example, the historical form documents may be maintained at a form document database (such as the form document database 130 of FIG. 1). In some embodiments, the form document database may store form documents of multiple form document types. In these embodiments, the form analysis platform may detect an indication of a particular form document type and identify the form documents at the form document database having the indicated form document type.

At block 304, the form analysis platform may apply a first label to a first set of images representative of form documents of the form type that are acceptable. For example, the form analysis platform may apply the first label in response to detecting that the corresponding form document was previously accepted as part of a conventional form document review process. For certain form types, the first label may be applied to images representative of form documents that have all of the required fields filled in and/or include a handwritten signature.

At block 306, the form analysis platform may apply a second label to a second set of images representative of form documents of the form type that that exhibit at least one characteristic that renders the form document unacceptable. For example, the form analysis platform may apply the second label in response to detecting that the corresponding form document was previously rejected as part of a conventional form document review process. In some embodiments, the at least one characteristic that renders the form document includes a first characteristic (e.g., a required field not being filled) and a second characteristic (e.g., a non-handwritten signature). In these embodiments, the form analysis platform may ensure that the second set of images includes a threshold number images representative of form documents that exhibit the first characteristic and a threshold number images representative of form documents that exhibit the second characteristic.

It should be appreciated that in some embodiments, the form documents maintained at the form document database may not include an indication of whether or not the form document was previously accepted or rejected by the form processor. In these embodiments, the form analysis platform may be configured to initiate a manual review process to obtain the historical decision data for training the image classification model. For example, the form analysis platform may be configured to present the form documents via a reviewer interface (such as the user interface 200 of FIG. 2) to obtain an indication of whether or not a historical form document is acceptable.

At block 308, the form analysis platform may train a neural network using the labeled first and second sets of images such that the neural network applies the first label to input form documents that are acceptable and the second label to input form documents that exhibit at least one characteristic that renders the form document unacceptable. In one embodiment, the neural network is a CNN that includes any number of transformer layers and/or layer types that operate upon the input set of image data. For example, the CNN may include one or more softmax layers, maxpool layers, convolution layers, etc.

Additionally, the form analysis platform may utilize any suitable techniques for training the CNN. For example, the form analysis platform may execute one or more training epochs in which the corpus of form documents is differently divided between a training set and a validation set. During each epoch, the form analysis platform may utilize the training set to train the CNN and then apply the trained CNN to the validation set to obtain one or more validation metrics (e.g., a loss metric, an accuracy metric, etc.). If the validation metrics do not satisfy a threshold value (e.g., validation accuracy over 95%, validation accuracy over 99%, etc.), then the form analysis platform may execute an additional training epoch.

The form analysis platform may be configured to store the trained model data after the validation threshold is achieved. For example, the form analysis platform may store the trained model data at a particular storage location for use by a labeling application (such as the labeling application 122 of FIG. 1). The method 300 may include additional, fewer, or alternate actions, including those discussed elsewhere herein.

Exemplary Determination of Acceptability of Form Documents

Figure 4:
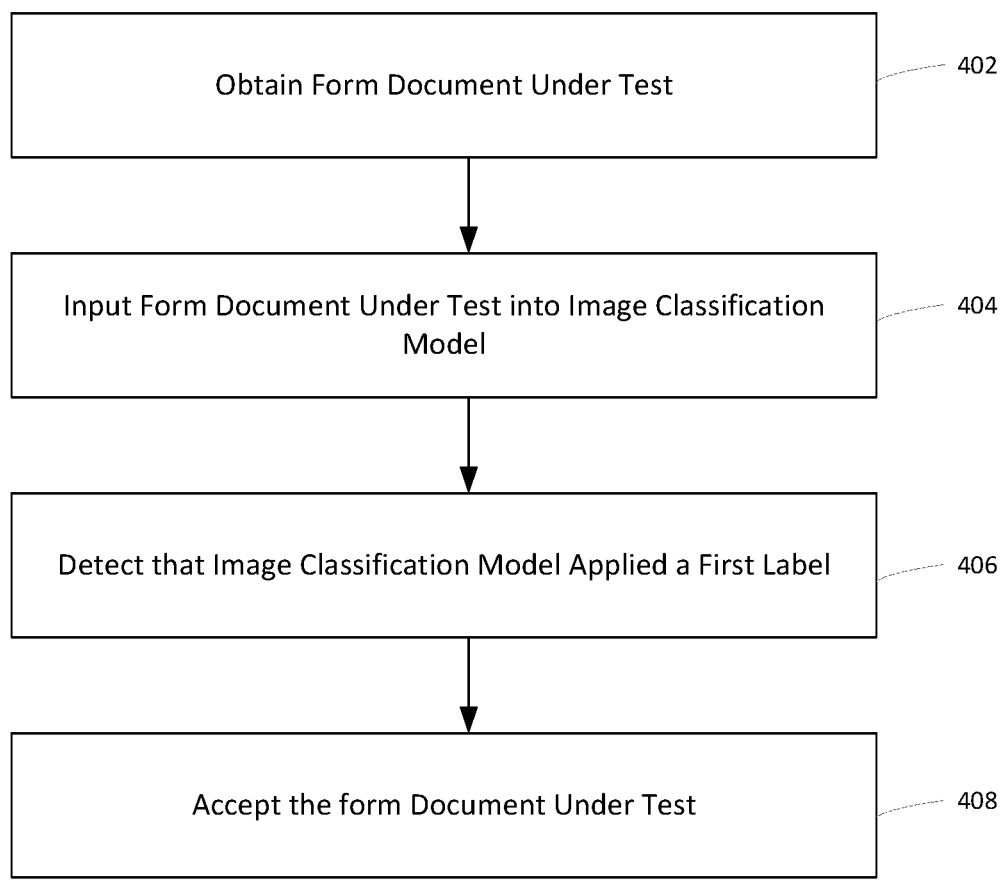
FIG. 4 illustrates a block diagram of an exemplary computer-implemented method for determining the acceptability of a form document under test, in accordance with embodiments disclosed herein.

FIG. 4 illustrates a block diagram of an exemplary computer-implemented method 400 for training an image classification model. The method 400 may be performed by one or more processors of a server (such as the server 110 of FIG. 1) configured to interface with a form analysis platform (such as the form analysis platform 115 of FIG. 1).

The method 400 may begin at block 402 when the server obtains a form document under test (such as the form document 103 of FIG. 1) of a form type. For example, the server may obtain the form document from a client device (such as the client device 105 of FIG. 1) executing an application that enables the submission of the form document under test to the server. In some embodiments, the form type is an application for an insurance policy, an insurance claim form, a certification form, or a governmentally-standardized form.

At block 404, the server may input the form document under test into an image classification model, such as an image classification model trained in accordance with the method 300. For example, the server may generate and transmit an instruction in accordance with an API application (such as the API application 123 of FIG. 1) of the form analysis platform that causes the form analysis platform to input the form document under test into the image classification model associated with a label application (such as the label application 122 of FIG. 1). The image classification model may be configured to apply a first label to input form documents that are acceptable and a second label to input form documents that exhibit at least one characteristic that renders the form document unacceptable. For example, the at least one characteristic that renders the form document unacceptable may include a presence of a non-handwritten signature or a presence of an incomplete field.

At block 406, the server may detect that the image classification model applied the first label to the form document under test. For example, the API application of the form analysis platform may return an indication that the form document under test is acceptable in response to the instruction generated at block 404.

At block 408, the server may accept the form document under test. In some embodiments, accepting the document may include the server may processing the form document under test. For example, if the form type is an application for an insurance policy, the server may route the form document under test to another computing system and/or application that processes applications for insurance policies.

While blocks 406 and 408 relate to a scenario where the form document under test is determined to be acceptable, in some scenarios, a form under test may be determined to be unacceptable. Accordingly, the server may (1) obtain a second form document under test of the form type; (2) input the second form document under test into the image classification model; (3) detect that the image classification model applied the second label to the second form document under test; and (4) reject the second form document under test.

In some embodiments, the method 400 may include a manual review process to ensure the accuracy of the outputs by the image classification model. Accordingly, the server may be configured to present a form document under test (such as the acceptable first form document under test or the unacceptable second form document under test) to a reviewer. For example, to present the form under test to the reviewer, the server may transmit the form document under test to one or more reviewer devices (such as the reviewer device 107 of FIG. 1) configured to present a review interface (such as the user interface 200 of FIG. 2). In addition to the form document under test, the server may be configured to present a sufficient number of documents to the reviewer device(s) to provide a statistically significant indication of the accuracy of the image classification model.

In response, the server may be configured to detect a review decisions provided by the reviewer. The server may then re-train the neural network of the image classification using the form document(s) under test and the corresponding review decision(s). More particularly, the server may transmit an instruction formatted in accordance with an API application of the form analysis platform that causes a training application to re-train the neural network in accordance with the review decision(s). The method 400 may include additional, fewer, or alternate actions, including those discussed elsewhere herein.

Additional Considerations

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed:

1. A computer-implemented method for determining acceptability of a form document, the method comprising:
    obtaining, via one or more processors, a form document under test of a form type;
    inputting, via the one or more processors, the form document under test into an image classification model trained by:
        applying a first label to a first set of images representative of form documents of the form type that are acceptable,
        applying a second label to a second set of images representative of form documents of the form type that that exhibit at least one characteristic that renders the form document unacceptable, and
        training a neural network using the labeled first and second sets of images such that the neural network applies the first label to input form documents that are acceptable and the second label to input form documents that exhibit at least one characteristic that renders the form document unacceptable;
    detecting, via the one or more processors, that the image classification model applied the first label to the form document under test; and
    accepting, via the one or more processors, the form document under test.

2. The computer-implemented method of claim 1, wherein the at least one characteristic that renders the form document unacceptable includes a presence of a non-handwritten signature or a presence of an incomplete field.

3. The computer-implemented method of claim 1, further comprising:
    presenting, via the one or more processors, the form document under test to a reviewer;
    detecting, via the one or more processors, a review decision provided by the reviewer; and
    re-training, via the one or more processors, the neural network using the form document under test and the review decision.

4. The computer-implemented method of claim 1, wherein accepting the form document under test comprises:
    processing, via the one or more processors, the form document under test.

5. The computer-implemented method of claim 1, further comprising:
    obtaining, via one or more processors, a second form document under test of the form type;
    inputting, via the one or more processors, the second form document under test into the image classification model;
    detecting, via the one or more processors, that the image classification model applied the second label to the second form document under test; and
    rejecting, via the one or more processors, the second form document under test.

6. The computer-implemented method of claim 5, further comprising:

presenting, via the one or more processors, the second form document under test to a reviewer;

detecting, via the one or more processors, a second review decision provided by the reviewer; and re-training, via the one or more processors, the neural network using the second form document under test and the second review decision.

7. The computer-implemented method of claim 5, wherein rejecting the second form document under test comprises:

alerting, via the one or more processors, a submitter of the second form document under test.

8. The computer-implemented method of claim 1, wherein:

the at least one characteristic that renders the form document includes a first characteristic and a second characteristic; and the image classification model is trained by ensuring that the second set of images includes a threshold number images representative of form documents that exhibit the first characteristic and a threshold number images representative of form documents that exhibit the second characteristic.

9. A system for determining acceptability of a form document, the system comprising:

one or more processors; and one or more non-transitory memories storing processor-executable instructions that, when executed by the one or more processors, cause the system to:

obtain a form document under test of a form type;

input the form document under test into an image classification model trained by:

applying a first label to a first set of images representative of form documents of the form type that are acceptable, applying a second label to a second set of images representative of form documents of the form type that that exhibit at least one characteristic that renders the form document unacceptable, and training a neural network using the labeled first and second sets of images such that the neural network applies the first label to input form documents that are acceptable and the second label to input form documents that exhibit at least one characteristic that renders the form document unacceptable;

detect that the image classification model applied the first label to the form document under test; and accept the form document under test.

10. The system of claim 9, wherein the at least one characteristic that renders the form document unacceptable includes a presence of a non-handwritten signature or a presence of an incomplete field.

11. The system of claim 9, wherein the instructions, when executed, cause the system to:

present the form document under test to a reviewer;

detect a review decision provided by the reviewer; and re-train the neural network using the form document under test and the review decision.

12. The system of claim 9, wherein to accept the form document under test, the instructions, when executed, cause the system to:

process the form document under test.

13. The system of claim 9, wherein the instructions, when executed, cause the system to:

obtain a second form document under test of the form type;

input the second form document under test into the image classification model;

detect that the image classification model applied the second label to the second form document under test; and reject the second form document under test.

14. The system of claim 13, wherein the instructions, when executed, cause the system to:

present the second form document under test to a reviewer;

detect a second review decision provided by the reviewer; and re-train the neural network using the second form document under test and the second review decision.

15. The system of claim 13, wherein to reject the second form document under test, the instructions, when executed, cause the system to:

alert a submitter of the second form document under test.

16. The system of claim 9, wherein:

the at least one characteristic that renders the form document includes a first characteristic and a second characteristic; and the image classification model is trained by ensuring that the second set of images includes a threshold number images representative of form documents that exhibit the first characteristic and a threshold number images representative of form documents that exhibit the second characteristic.

17. A non-transitory computer readable storage medium storing computer-executable instructions that, when executed by one or more processors, cause the one or more processors to:

obtain a form document under test of a form type;

input the form document under test into an image classification model trained by:

applying a first label to a first set of images representative of form documents of the form type that are acceptable, applying a second label to a second set of images representative of form documents of the form type that that exhibit at least one characteristic that renders the form document unacceptable, and training a neural network using the labeled first and second sets of images such that the neural network applies the first label to input form documents that are acceptable and the second label to input form documents that exhibit at least one characteristic that renders the form document unacceptable;

detect that the image classification model applied the first label to the form document under test; and accept the form document under test.

18. The non-transitory computer readable storage medium of claim 17, wherein the at least one characteristic that renders the form document unacceptable includes a presence of a non-handwritten signature or a presence of an incomplete field.

19. The non-transitory computer readable storage medium of claim 17, wherein to accept the form document under test, the instructions, when executed, cause the one or more processors to:

process the form document under test.

20. The non-transitory computer readable storage medium of claim 17, wherein the instructions, when executed, cause the one or more processors to:

obtain a second form document under test of the form type;

input the second form document under test into the image classification model;
detect that the image classification model applied the second label to the second form document under test; and
reject the second form document under test.

\* \* \* \* \*